UNITED STATES PATENT OFFICE.

CURT PHILIPP AND HANS SCHMIDT, OF RADEBEUL, NEAR DRESDEN, GERMANY, ASSIGNORS TO CHEMISCHE FABRIK VON HEYDEN AKTIENGESELLSCHAFT, OF RADEBEUL, NEAR DRESDEN, GERMANY.

MANUFACTURE OF AROMATIC STIBINIC ACID.

1,260,707.  Specification of Letters Patent.  Patented Mar. 26, 1918.

No Drawing.  Application filed July 16, 1912. Serial No. 709,779.

*To all whom it may concern:*

Be it known that we, CURT PHILIPP, a subject of the King of Saxony, and HANS SCHMIDT, a subject of the King of Prussia, and resident the first of 6 Sedanstrasse, Radebeul, near Dresden, the second of 6 Gellertstrasse, Radebeul, near Dresden, Kingdom of Saxony, German Empire, have invented a new and useful Manufacture of Aromatic Stibinic Acid, of which the following is a specification.

It is a known fact that very few aromatic stibinic acids have been hitherto described and the preparation of these acids was very difficult, for the starting point was antimony trichlorid, and by the action of this substance on aromatic compounds, di- and triphenylstibinic derivatives were obtained. See, for instance, *Berichte d. Deutschen Chemischen Gesellschaft*, 37, 4621.

According to the process forming the object of the present invention aromatic stibinic acids of the monophenyl-series having the nucleus

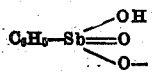

are obtained very easily and in a very good yield, by treating aromatic diazo-compounds with salts of antimony trioxid and by splitting off the diazo-group by the usual methods. The new process may be performed as follows:

*Example I.—Phenylstibinic acid.*

140 parts of antimony trioxid are dissolved at about 20° C. in 764 parts of hydrochloric acid of 1,123 specific gravity and treated with 3600 parts of a solution containing 16.7 per cent. of sodium hydroxid. This mixture is rapidly cooled, whereupon a part of the sodium salt of antimony trioxid separates in a solid form. As soon as the temperature is about 0°, ice is added. The mass is well stirred and a solution of diazobenzene rapidly added. This solution is prepared before by adding 71 parts of sodium nitrite in the usual manner to a solution of 93 parts of anilin dissolved in 1000 parts of water and 147 parts of concentrated sulfuric acid. When the diazo-solution has been added to the antimony trioxid solution, a strong development of nitrogen takes place. After several hours the excess of sodium hydroxid is neutralized by adding diluted sulfuric acid (red litmus paper should only slightly be blued). The cold mixture is filtered and phenylstibinic acid is precipitated from the filtrate by adding hydrochloric acid. After several hours the phenylstibinic acid is filtered off and washed with water.

The raw acid prepared this way generally contains antimony trioxid from which it is separated in the following manner: 100 parts of the acid are dissolved in 250 parts of hydrochloric acid of 1.123 specific gravity, adding a little animal charcoal and then saturating the hot solution with solid ammonium chlorid. Phenylstibine oxychlorid is formed, which crystallizes in fine flakes and is filtered off after cooling. It is then washed with a saturated solution of ammonium chlorid in hydrochloric acid. This oxychlorid is transformed into pure phenylstibinic acid by treating with a well-cooled solution of sodium carbonate slightly in excess, filtering the solution and precipitating pure phenylstibinic acid by adding a diluted acid. It may be obtained in small crystals by crystallizing from a hot mixture of alcohol and benzene.

Phenylstibinic acid prepared according to the present invention is easily soluble in solutions of sodium carbonate or sodium hydroxid. By adding to such solution common salt or an excess of sodium hydroxid the sodium salt of phenylstibinic acid is precipitated. The sodium salt is slightly soluble in water. Solutions containing one half of one per cent. of this salt are quite stable at ordinary temperature and of an entirely neutral reaction. If a solution so formed is heated a white precipitate is formed, which may be redissolved by adding sodium hydroxid. Salts of an absolutely neutral reaction are obtained by dissolving one molecule of phenylstibinic acid in ¼ to ⅓ molecule of an alkali hydroxid, heating this solution, filtering and evaporating. Salts which have been prepared with ½ molecule of an alkalihydroxid have neutral reaction only when they are highly diluted. Salts prepared with 1 or 2 molecules of an alkali-hydroxid have an alkaline reaction whether they are diluted or not.

*Example II.—Paraoxyphenylstibinic acid.*

A representative of the most valuable class of aromatic antimony compounds having the nucleus

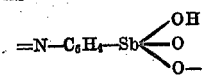

and containing nitrogen is shown in the following example:

109 parts of para aminophenol are dissolved in a mixture of 147 parts of sulfuric acid and 1000 parts of water and diazotized as usual with a solution of 71 parts of sodium nitrite. The solution of the diazo compound is poured into a solution of the sodium salt of antimony trioxid as described above. When the development of nitrogen has ceased, the solution is saturated with carbon dioxid in order to precipitate by-products and a part of antimony trioxid, which has not reacted with the diazo compound. After filtering, the mother liquid is treated with common salt, and para-oxy-phenyl-stibinic acid is precipitated by addition of a diluted acid. It is slightly soluble in cold, and more readily soluble in hot water and easily soluble in diluted methyl-alcohol. When treated with ammonia water the acid is dissolved forming a salt, and when ammonium hydrochlorid is added, the solid ammonium salt is precipitated. The acid is easily soluble in alkalihydroxids and alkali-carbonates even if an excess of an alkalihydroxid is added, but the alkali salts are precipitated by common salt.

*Example III.—Para-acetyl-amino-phenyl-stibinic acid.*

150 parts of monoacetyl- para-phenylen-diamin are added to a well cooled mixture of 147 parts of sulfuric acid and 1000 parts of water and diazotized by a solution of 71 parts of sodium nitrate. This mixture is added to a solution of antimony trioxid as described in Example I. When the development of nitrogen has ceased, the alkaline solution is filtered, nearly neutralized by adding sulfuric acid and then saturated with carbonic dioxid, in order to precipitate any impurities and antimony trioxid not having reacted with the diazo solution. The mass is filtered a second time and saturated with sodium chlorid or other sodium salts, whereupon the sodium salt of para-acetyl-amino-phenyl-stibinic acid precipitates. It is separated from adherent inorganic salts by dissolving in methylic alcohol. When the methyl alcohol is evaporated at a low temperature, the sodium salt of para-acetyl-amino-phenyl-stibinic acid is obtained. It is easily soluble in water and shows an absolutely neutral reaction. By the addition of acids to its solutions, para-acetyl-amino phenyl-stibinic acid is precipitated, which is easily soluble in ammonia water, alkaline hydroxids and carbonates, but difficultly soluble in an excess of an alkalihydroxid.

The process described in the foregoing examples may be carried out in a similar manner by employing other aromatic amino compounds in order to prepare the corresponding aromatic stibinic acids. The process may be modified in many respects according to the nature of the amino compound employed. The new acids prepared according to the present invention are of great therapeutic and technical value.

What we claim is:

1. The manufacture of aromatic antimony compounds of the mono-phenyl-series, consisting in treating an aromatic diazo-compound with antimony trioxid.

2. The manufacture of substitution products of phenyl-stibinic acid, consisting in treating substitution products of the diazo benzol with antimony trioxid.

3. The manufacture of para-acidyl-amino-phenyl-stibinic acid, consisting in treating diazotized mono-acidyl-para-phenylene-diamin with antimony trioxid.

4. The manufacture of antimony compounds of the mono-phenyl-series, consisting in treating aromatic diazo-compounds with antimony trioxid, neutralizing and filtering the so obtained solution, precipitating the aromatic stibinic acid, dissolving the crude acid in hydrochloric acid, saturating the solution with easily soluble salts, removing by filtration the oxychlorid thereby derived, treating it with alkali carbonate and transforming the salt of the antimony compound into free acid by the addition of a dilute acid.

5. The aromatic antimony compounds of the monophenyl series having the nucleus

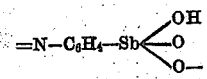

6. Para-acidyl-amino-phenyl-stibinic acids forming powders easily soluble in ammonia water, alkali hydroxids and carbonates.

In testimony that we claim the foregoing as our invention, we have signed our names in presence of two witnesses, this 29th day of June, 1912.

CURT PHILIPP.
HANS SCHMIDT.

Witnesses:
PAUL ARRAS,
CLARE SIMON.